R. P. HENDERSON.
VALVE LIFTER.
APPLICATION FILED MAR. 26, 1915.
1,168,205.
Patented Jan. 11, 1916.
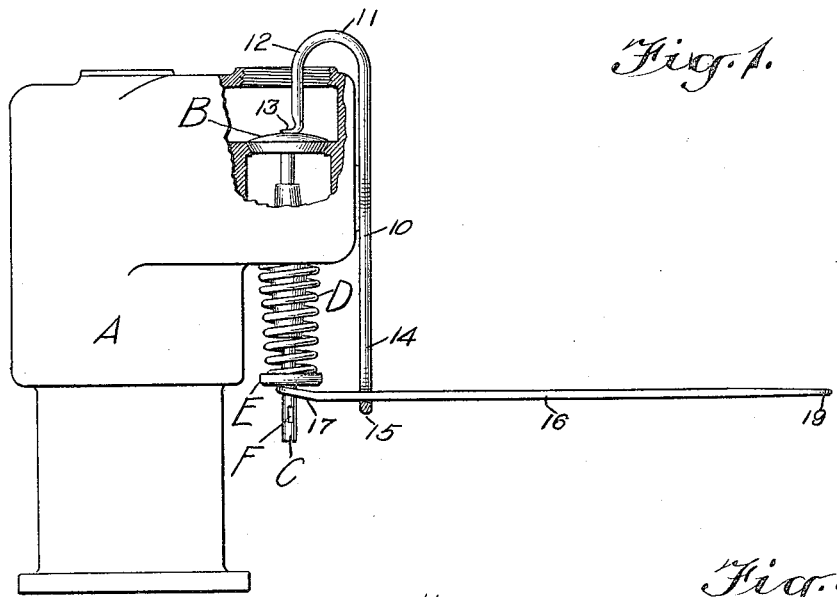
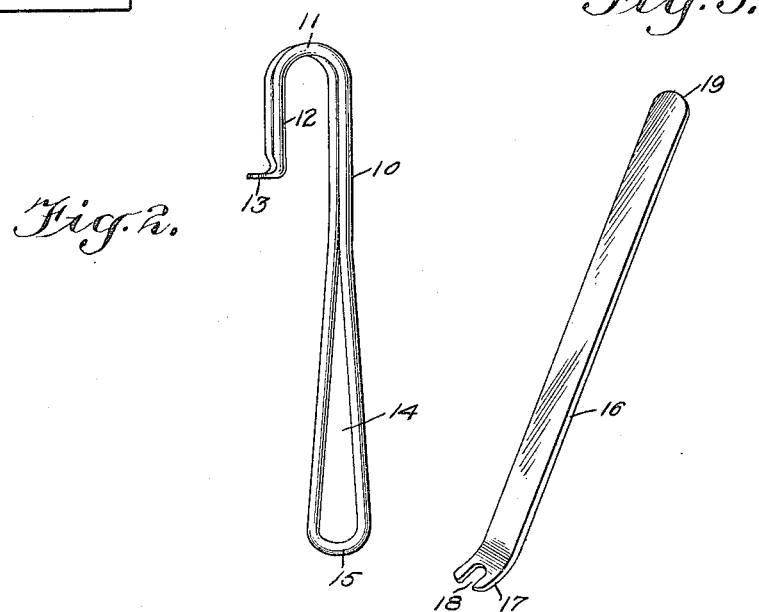
WITNESSES:
INVENTOR
Robert P. Henderson
BY
ATTORNEY

UNITED STATES PATENT OFFICE.

ROBERT P. HENDERSON, OF NEW YORK, N. Y.

VALVE-LIFTER.

1,168,205. Specification of Letters Patent. Patented Jan. 11, 1916.

Application filed March 26, 1915. Serial No. 17,132.

*To all whom it may concern:*

Be it known that I, ROBERT P. HENDERSON, a citizen of the United States, and a resident of the city of New York, borough of Manhattan, in the county of New York and State of New York, have invented a new and Improved Valve-Lifter, of which the following is a full, clear, and exact description.

My invention relates to valve lifters for use in connection with the valves of internal combustion engines. Devices for the purpose involve, as essentials, means to bear against the valve to clamp the same, and means to engage the washer of the valve stem, beneath the spring, in a manner to exert pressure on the spring and compress the same for the ready removal of the cotter pin, or equivalent expedient employed for retaining the washer.

Objects of my invention are to provide for embodying the mentioned essential features of a valve lifter in a construction employing but two members, and these of the simplest form, which may be instantly placed in operative correlation, or instantly separated to occupy a minimum space; to provide a valve lifter on which a washer engaging lever will be freely rockable vertically and laterally, and freely slidable on the co-acting valve clamp member, to position the lever for engagement with and movement of the washer without any positive pivotal connection between the lever and the co-acting member, so that the simplest and most direct movements will effect the instant engagement of the washer and the compression of the spring; and to provide a washer engaging lever of a form that will permit of its effective use as a means for removing the pneumatic tire from a wheel.

The invention will be particularly explained in the specific description following.

Reference is had to the accompanying drawings forming part of this specification, in which similar characters of reference indicate corresponding parts in all the views, and in which:

Figure 1 is a side elevation of a valve lifter embodying my invention; Fig. 2 is a perspective view of a valve engaging member; and Fig. 3 is a perspective view of the shank engaging lever.

In the illustration, there is conventionally shown an integral combustion cylinder A, a valve B having a stem C, together with the valve spring D on said stem and the usual washer E, which is ordinarily held in place by a cotter pin through an opening F.

My improved valve lifting device comprises a valve clamping member, the body of which is in the form of a shank 10. This shank is formed of a single length of rod or wire returned on itself. Both members of the shank 10 are curved laterally as at 11 and return bent to provide downwardly extending members 12 which are adapted to extend within the cylinder A, and engage the valve B. The lower ends of the return members 12 are formed with lateral feet 13 constituting valve clamping members to bear on the top of said valve.

The members forming the shank 10 at the lower end of said shank are formed into a closed loop 14, the members of the shank converging toward the upper end of the loop and broadening at the lower end. The bend 15 at the lower end of the loop, and constituting the bottom wall of the latter, forms the fulcrum for a separate lever 16, preferably in the form of a flat bar. The said lever is receivable in the loop 14 to rest on the bend 15, and the arrangement is such that the lever may freely slide longitudinally in the loop to project the forward end 17 thereof to any desired degree beyond the loop. Moreover, the lever is free to rock in the loop vertically or transversely, being without any positive pivotal connection with the loop. The lever 16 at its forward end 17 preferably is slightly tilted upwardly, and the said forward end is forked to present a longitudinal slot 18, whereby to receive the stem C and permit the fork members to effectively engage beneath the washer E of the valve.

It will be seen that the above described construction involves but two simple elements. These have no possible connection with each other when in operative relation; all that is necessary is to dispose the shank 10 along the cylinder with the depending member 12 in position for the feet 13 to engage the valve. No nicety of adjustment is necessary in positioning the shank and its valve clamp member, since the lever 16 may be instantly slid through the loop 14 and moved therein in any direction necessary to engage the valve washer, so that the simple movement of entering the lever and rocking the same will serve to effectively compress the spring D and permit the usual cotter pin to be removed. Similarly, the two members will occupy but little space when not in use.

In practice, the lever 16 is adapted to be utilized at the end 19 opposite the slot 18 for removing a pneumatic tire, and the tool is thus particularly useful to operators of automobiles.

Having thus described my invention, what I claim as new and desire to secure by Letters Patent, is:

A valve lever composed of a valve clamping member return bent at one end to enter a cylinder and bear against a valve, and formed at the opposite end with a loop presenting a bottom bearing wall, and a separate lever in the form of a bar freely slidable in the loop to project the forward end of the lever to a position to engage a valve washer, the lever being furthermore freely rockable in the loop, the bottom bearing wall of the latter serving as a fulcrum for the lever.

In testimony whereof I have signed my name to this specification in the presence of two subscribing witnesses.

ROBERT P. HENDERSON.

Witnesses:
J. L. McAuliffe,
G. H. Emslie.

Copies of this patent may be obtained for five cents each, by addressing the "Commissioner of Patents, Washington, D. C."